United States Patent [19]

Yoshida

[11] Patent Number: 4,513,336
[45] Date of Patent: Apr. 23, 1985

[54] CASSETTE TAPE RECORDER

[75] Inventor: Kobun Yoshida, Saitama, Japan

[73] Assignee: Pioneer Electronic Corporation, Tokyo, Japan

[21] Appl. No.: 413,844

[22] Filed: Sep. 1, 1982

[30] Foreign Application Priority Data

Sep. 2, 1981 [JP] Japan .................. 56-130488[U]

[51] Int. Cl.³ ............................................. G11B 5/54
[52] U.S. Cl. ................................................. 360/105
[58] Field of Search .............. 360/105, 109, 93, 96.3, 360/96.5, 104

[56] References Cited

U.S. PATENT DOCUMENTS 4,176,383 11/1979 Suzuki .................................. 360/105
4,212,040 7/1980 Yoshida et al. ..................... 360/96.3
4,344,096 8/1982 Tanaka et al. ...................... 360/96.5
4,412,638 11/1983 Tomabechi ........................ 360/105 X Primary Examiner—John H. Wolff
Attorney, Agent, or Firm—Sughrue, Mion, Zinn, Macpeak and Seas

[57] ABSTRACT

A cassette recorder is provided with an integral head base and head plate, where the head base is provided with an engagement surface for contacting a guide pin of the cassette in a forward position. The recording-playback head is directly mounted to the head base by screws and registering apertures, and the distance between the apertures and the engagement surface is selected such that the head surface protrudes slightly beyond the engagement surface for good contact with the tape.

7 Claims, 4 Drawing Figures

CASSETTE TAPE RECORDER

BACKGROUND OF THE INVENTION

The present invention relates to a cassette tape recorder, and more particularly to an improvement in the accuracy in the positioning of a forward position of a head thereof.

In the prior art, the head of the cassette tape recorder is mounted by screws through a head base made of synthetic resin to a head plate which is moved in the record-playback operation. With the sliding movement of the head plate, the head is moved toward the travelling surface of the tape within the tape cassette. However, since the positioning of the forward position of the head is achieved by bringing the head plate into contact with a guide pin of the cassette case, it is necessary to position the head at a predetermined position with respect to the head plate. Therefore, in the prior art, the head base is precisely positioned on the head plate and thereafter, the head is precisely positioned on the head base. In addition, since the record-playback head is not a molded product of synthetic resin, it is necessary to position and mount the head on the head base using screws. A great amount of assembling work is thus unavoidable, and there is a certain limit to the mounting accuracy. Therefore, according to the prior art, the positioning of the head is unsatisfactory.

SUMMARY OF THE INVENTION

Accordingly, an object of the invention is to overcome the above noted defects and to simplify the assembly of the head and enhance the positioning accuracy of the forward position of the head whereby the contactability of the head against the travelling tape surface may be considerably improved.

In order to achieve this and other objects, according to the present invention, there is provided a cassette tape recorder characterized in that the head is adjustably mounted on the head base and fixed by screws, and that the head base is directly engaged with the guide pin of the cassette case whereby at the engagement position of the head base, head positioning is carried out.

DETAILED DESCRIPTION OF THE EMBODIMENT

Figure 1:
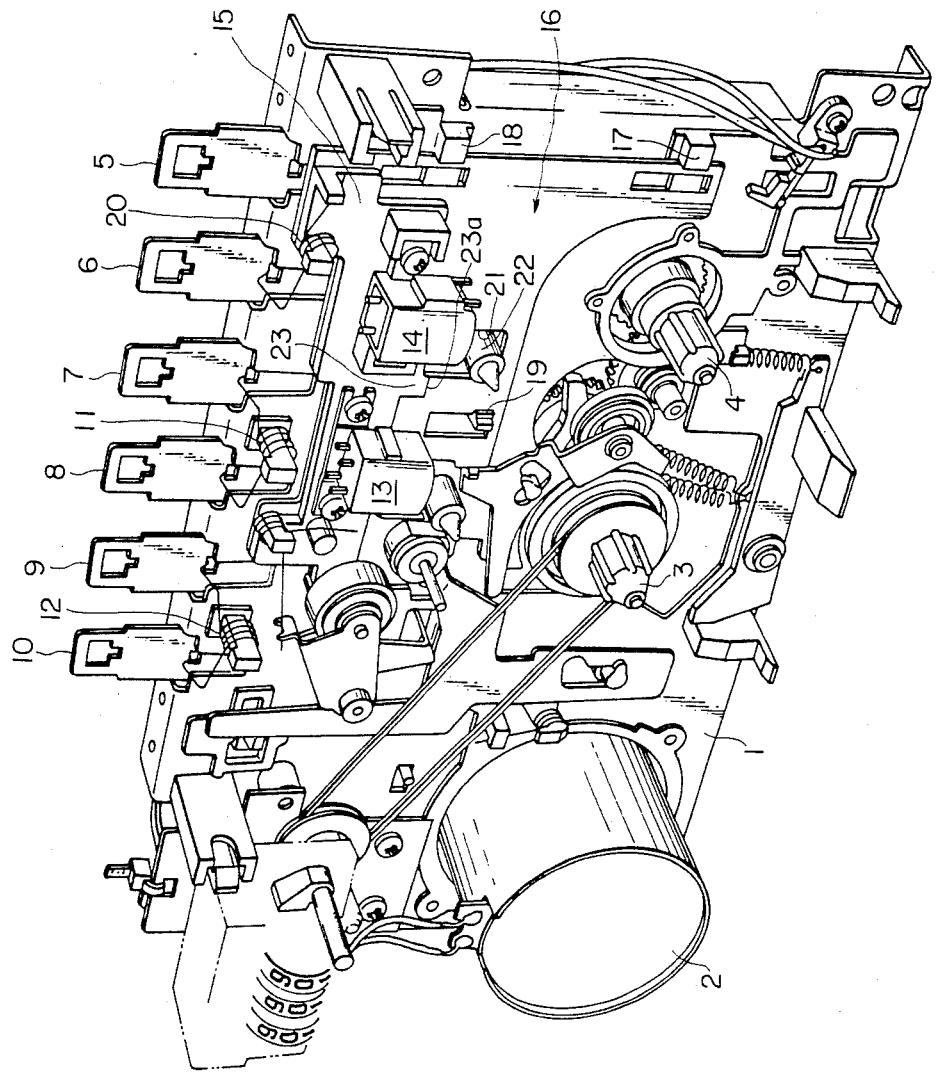
FIG. 1 is a perspective view of the overall tape recorder mechanism.

FIG. 1 shows the internal mechanism of a cassette tape recorder. The cassette tape recorder mechanism comprises a chassis 1 on which a motor 2 is mounted, and a takeup reel shaft 3 and a rewind reel shaft 4 rotatably supported on the chassis 1. The takeup reel shaft 3 and the rewind reel shaft 4 are selectively driven by the motor 2 through a power transmission mechanism (not shown). Control levers 5 through 10 for selecting various modes of tape recorder operation are supported on the chassis 1 for vertical sliding movement. The control levers 7, 8 are urged upwardly by a torsion spring 11 and the control levers 9, 10 are urged upwardly by a torsion spring 12. The recording mode control lever 5 and the playback mode control lever 6 are also urged upwardly by a torsion spring attached to a back of the chassis 1, and are retainable in their pushed-in positions by a lock mechanism (not shown) ganged with the stop mode control lever 9. The above construction is well known in the art.

A record-playback head 13 and an erase head 14 are mounted by a head base 15 on a head plate 16 which is vertically movably supported on the chassis 1 and guided in its movement by guide projections 17, 18, 19. The head base 15 is integral with the head plate 16 and resiliently engages the playback mode control lever 6 through a torsion spring 20. Thus, the head plate 16 is movable downwardly in response to the depression of the control lever 6 and is retained in its lower position by the control lever 6. The recording mode control lever 5, as it is depressed, causes the playback mode control lever 6 to move therewith. Accordingly, the head plate 16 is also movable downwardly when the recording mode control lever 5 is depressed.

The head plate 16 has a slot 21 through which extends one of a pair of guide pins 22 for a cassette half. The head plate 16 is made of synthetic resin and has an integral stopper 23 located in confronting relation with the guide pin 22. The stopper 23 serves to position the record-playback head 13 and the erase head 14 on the head base 15 in an advanced position with respect to the path of travel of the magnetic tape in a cassette (not illustrated) when an end face 23a of the stopper 23 is positioned in abutment against the guide pin 22.

Figure 2:
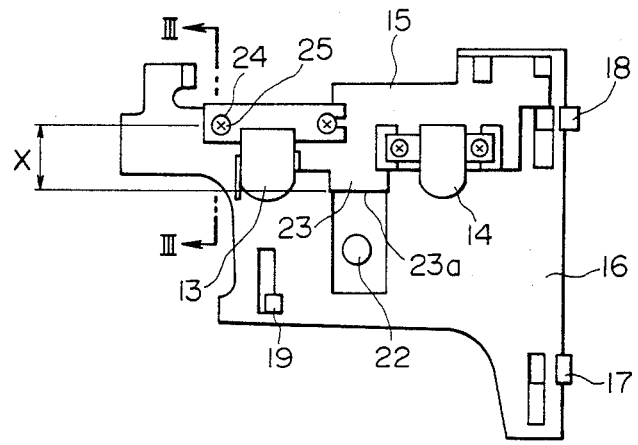
FIG. 2 illustrates the mounting of a record-playback head on a head base.
Figure 3:
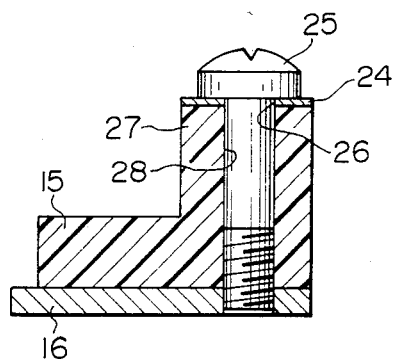
FIG. 3 is a detail of a part of FIG. 2, taken along line III—III of FIG. 2.

FIG. 2 shows a state in which the record-playback head 13 and the erase head 14 are mounted on the above described head base 15. In particular, the record-playback head 13 has a flange 24 made of a thin plate for mounting, and the record-playback head 13 is fixedly mounted to the head base 15 by screws with the mounting structure described below, in alignment with the head base 15. Namely, as shown in FIG. 3, the screw 25 is threadedly engaged with the head plate 16 through a though hole 26 of the flange 24 and a through hole 28 of a sleeve 27 which extends from an upper surface of the head base 15. The diameter of the above described through hole 26 is the same as that of the through hole 28. In addition, both through holes are firmly engaged with the screw 25 due to the size of this diameter.

With such a construction, the head base 15 is integrally molded of synthetic resin, and in this case, the distance X between a stop end surface 23a of a stop portion 23 and the center of the through hole 28 is suitably selected. Thus, when the flange 24 of the record-playback head 13 is fixed to the head plate 16 through the support sleeve 27 of the head base 15 with the screws, the distance between the center of the through hole 26 of the flange 24 and the end surface 23a is kept constant whereby the record-playback head 13 is accurately positioned with respect to the head base 15.

The head base 15 with the thus positioned record-playback head 13 is moved downwardly together with the head plate 16 upon the depression of the playback mode operating lever 6 or the record mode operating lever. As a result, the record-playback head 13 is advanced toward the tape surface of the cassette. In this case, the stop end surface 23a of the stop portion 23 formed on the head base 15 is engaged with a guide pin 22 of the cassette case to thereby achieve the positioning of the record-playback head 13 at its forward position. Since, in this condition, the head plate 16 is resiliently engaged with the playback mode operating lever 6 by the torsion spring 20, the end surface 23a may be brought into resilient contact with the guide pin 22.

As mentioned above, according to the present invention, the head is positioned and mounted on the head plate only through the screw mounting process, and in addition, the head plate is brought into direct contact with the guide pin of the cassette case, to thereby achieve forward positioning of the head. Therefore, assembly work may be considerably reduced and moreover, the accuracy in mounting the head is enhanced to issue good contactability of the head against the tape travelling surface. As a result, damage to the tape is prevented and the quality of the sound produced therefrom is enhanced.

Figure 4:
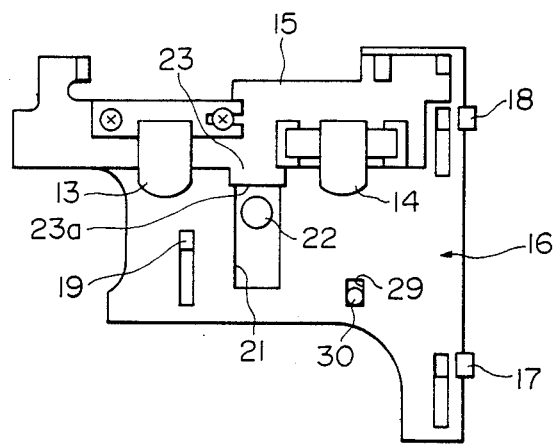
FIG. 4 illustrates another construction according to the invention.

A second embodiment is shown in FIG. 4, wherein the head plate 16 has on its back an engaging projection extending through a slot defined in the chassis 1. The engaging projection is held in engagement with a lever movable in response to depression of the rewinding mode control lever 7 and the fast-forward mode control lever 8, and is movable upwardly for a predetermined distance when the control levers 7, 8 are depressed. Upon depression of the control levers 7, 8, therefore, the head plate 16 is resiliently raised against the biasing force of the torsion spring 20 to retract the record-playback head 13.

According to this embodiment, the head plate 16 has a window 29, and the chassis 1 has on its back an engagement pin 30 movable into and out of the window 29 in coaction with a music select mode switch to establish positioning in a music select mode. When the engagement pin 30 is moved forward into the window 29, the head plate 16 is prevented from moving upwardly beyond a predetermined interval.

The tape recorder mechanism of this embodiment thus constructed will operate as follows: When the music select mode switch is depressed, the engagement pin 30 enters the window 29 in the head plate 16 and hence is in a position to prevent the head plate 16 from being lifted beyond a predetermined interval. The playback mode control lever 6 is depressed and at the same time the fast-forward mode control lever 8 is depressed. The record-playback head 13 is withdrawn from the advanced playback position. At this time, however, the upward movement of the record-playback head 13 is arrested when the engagement pin 30 is engaged by a lower edge of the window 29 of the head plate 16.

What is claimed is:

1. A cassette tape recorder comprising, a chassis of the type receiving a cassette tape at a fixed position thereon, at least one magnetic head for magnetically interacting with said cassette tape when positioned at a forward position with respect to a surface of said cassette tape, a head plate, a head base fixed to said head plate, said at least one magnetic head fixed to said head base, said head plate being slidably moveable relative to said chassis to move said at least one head towards said surface of said cassette tape in accordance with a record-playback operation of said recorder, said tape cassette being of the type having a guide pin thereon, means on said head base engageable with said guide pin for positioning said at least one head at said forward position when said engageable means is in contact with said guide pin.

2. An apparatus as claimed in claim 1, said head including a mounting flange, and threaded fasteners mounting said flange to said head base.

3. An apparatus as claimed in claim 2, said fasteners fastening said head to said head base, and said head base to said head plate.

4. An apparatus as claimed in claim 1, said head being mounted to said head base solely by mounting screws.

5. An apparatus as claimed in claim 2, a distance between said guide pin and engaging means of said head base and apertures in said head base for receiving said threaded fasteners being selected such that said head, when mounted, protrudes slightly beyond said engaging means in the direction towards said surface of said tape.

6. An apparatus as claimed in claim 1, said cassette recorder including mode control means resiliently connected to said head base.

7. An apparatus as claimed in claim 1, said head base being integral with said head plate.

* * * * *